May 26, 1953     S. I. GABRIELSON     2,639,602
EMERGENCY DECLUTCHING MECHANISM FOR CLOTHES WRINGERS
Filed Oct. 30, 1951
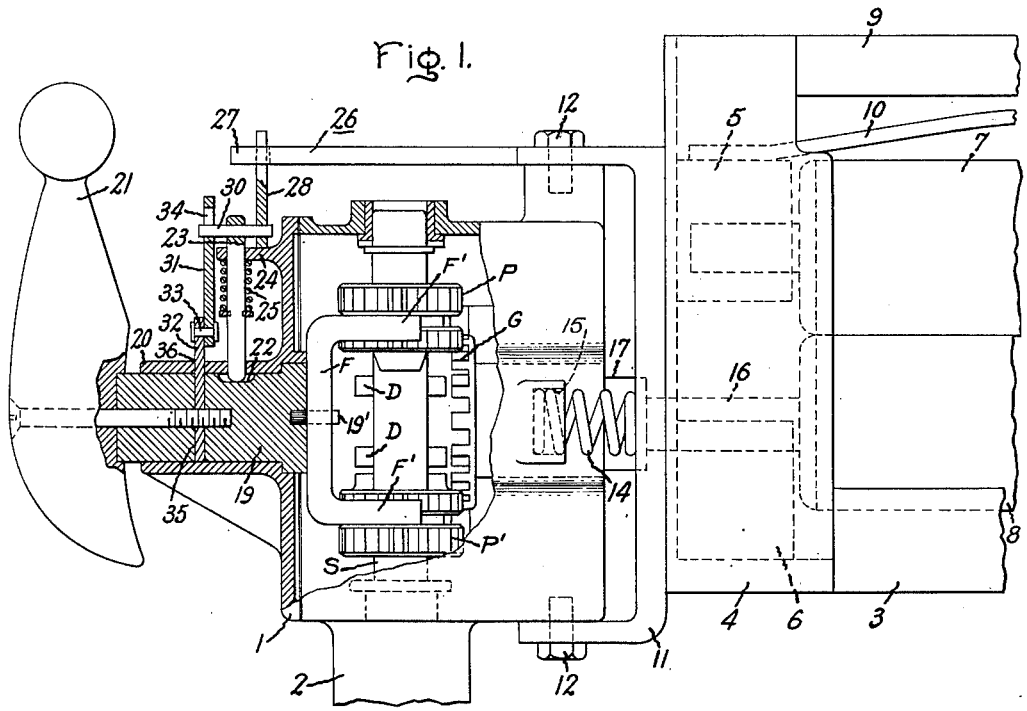
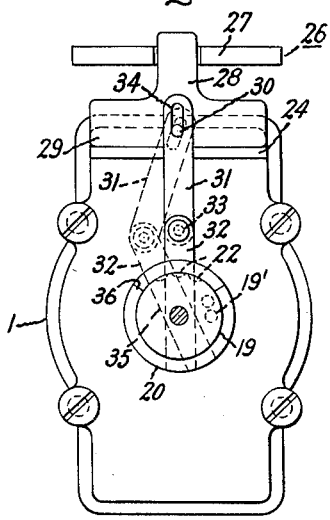 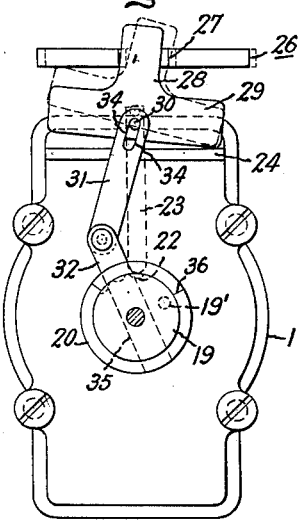
Inventor:
Samuel I. Gabrielson,
by *Sheridan W. Bell*
His Attorney.

Patented May 26, 1953

2,639,602

UNITED STATES PATENT OFFICE 2,639,602

EMERGENCY DECLUTCHING MECHANISM FOR CLOTHES WRINGERS

Samuel I. Gabrielson, Lynn, Mass., assignor to General Electric Company, a corporation of New York Application October 30, 1951, Serial No. 253,825

4 Claims. (Cl. 68—269)

This invention relates to an improved clothes wringer and safety device of the "instinctive" type, and it has for a principal object the provision of a simplified emergency mechanism by which the operator may immediately disconnect the wringer roll from its drive shaft by pushing or pulling on the drive frame.

Broadly speaking, emergency devices of this general type are well known. Generally, these devices embody a spring or other energy storing device for operating the wringer to neutral in an emergency in response to angular movement of the wringer frame relative to the wringer head. This invention provides an improved mechanism for translating the angular movement of the wringer frame relative to the wringer head into an appropriate release movement of detent to free a gear shifting device within the head for return to neutral and also for moving the shifting device into neutral; the improved mechanism comprises a direct operating mechanical linkage connection between the wringer head and the detent on the one hand, and the wringer head and shifting device on the other, thereby obviating the necessity of a spring or other energy storing device for returning the gear shifting means to neutral. In a presently preferred embodiment I hold the gear shift means in either of the operating positions at which the direction of rotation of the driven roller of the wringer is established by means of a simple detent, such as a spring biased plunger which engages an indexing notch, to maintain the selected drive position. The wringer frame is pivotally supported on the wringer head and has a lever mechanically associated with a detent release device which upon rotation by the lever withdraws the detent from its notch. The detent release device is self-pivoted, that is, side edges of its base portion afford fulcrums about which it may rotate and, hence, there is no conventional permanent pivot which may jam or corrode by reason of high humidity, corrosive effect of detergents, and other disadvantageous conditions present during laundering. The lever also is mechanically associated directly with the gear shift means through the detent release device so as to return the shift means to neutral after the detent has been released.

My invention is featured by a simplification of manufacturing and assembly operations without sacrificing their reliability, as will be apparent from the following detailed description of the presently preferred embodiment shown in the accompanying drawing in which Fig. 1 is a fragmentary side elevation, partly in section, of a wringer embodying my invention; Fig. 2 is an end elevation somewhat schematic, showing in solid lines the gear shift lever in neutral, and in dotted line the drive position thereof; and Fig. 3 is a similar view showing the gear shift lever in drive position in full lines and indicating in dotted lines the lift of the detent responsive to displacement of the wringer frame.

Referring to Fig. 1, the clothes wringer includes a drive head 1, arranged in any suitable fashion for support on a column 2 which in turn is supported on a structural part of a washing machine (not shown). The wringer frame 3 which may be of any conventional pattern, includes end stiles such as the stile 4 within which are housed upper and lower bearing blocks 5, 6 journaling the shafts of the two wringer rolls 7, 8. A top frame member 9 confines a bow spring 10, the ends of which rest upon the top roll bearing blocks to maintain the wringer roll pressure.

The wringer frame 3 is pivotally supported on the head to swing on a vertical axis by means of a bracket 11 secured to the end of stile 4 and affixed to the wringer head by a pair of pivot screws 12 aligned in a common vertical axis. I prefer to use non-corrosive materials such as the various die-casting alloys for the head and bracket to insure that the bracket will always be freely swingable on the head. The supporting bracket 11 is of substantial width for cooperation with a pair of coil springs 14 (only one of which is shown) which are socketed in pockets 15 at the sides of head 1 on opposite sides of the axis of the pivot screws 12. These springs 14 maintain the normal operating relation between the frame and head and insure the drive engagement of the lower roll drive shaft 16 with its drive socket 17.

It will be understood that a power driven shaft S journaled in the head has the usual two-drive pinions P, P' slidable thereon and engaging with the crown gear or equivalent G for mechanically connecting it to the drive socket 17. Because this construction may be of any suitable type, for example, that shown in the U. S. Patent to Samuel I. Gabrielson, 2,561,195, granted July 17, 1951, it has not been detailed here. It is sufficient to know that the pin 19' projecting from a rotating shaft 19 engages the shift fork F having fingers F' riding in slots in the said pinions. Thus, when a driving connection is to be made with gear G, shaft 19 is rotated to shift fork F up or down to engage a pinion with a drive pin D projecting from shaft S according to the desired rotational direction of the lower wringer roll 8.

The shaft 19 is rotatably journaled in a collar 20 extending from the wringer head; and it is operated by a shift handle 21 which is fixed to the outer end of the shaft so that rotation of the handle rotates the shaft with it as a unit.

Shaft 19 has three detents 22 for cooperation with a detent pin 23 slidably mounted for movement in a vertical direction in the collar 20 and in the bracket 24 projecting from the wringer head, and suitably biased by a spring 25 to be driven into one of the notches 22 as it comes into registry therewith. The said notches 22 establish the three operating positions of the shift handle 21, namely, the neutral position and the two rotating positions.

The operating handle and detent release means include a lever arm 26 which may be integral with the bracket 11 to extend over the top of the head; this arm terminates in a fork 27 embracing the vertical body portion of the detent release actuator 28 shaped as an inverted T, as shown in Figs. 2 and 3. The base 29 of the actuator rests squarely upon the bracket 24 as shown in Figs. 1 and 2. Moreover, the base portion of the actuator is pivotally affixed to the detent 23 by means of a pin 30, which pin is constrained to move vertically with the detent. The pin 30 also functions to connect the release lever 26 with the gear shift shaft 19 by means of a pair of links 31 and 32 which are pivotally interconnected at adjacent ends by means of a pin 33. The opposite end of the link 31 has an elongated slot 34 which receives the pin 30, as shown; while the opposite end portion, in fact the major portion, of the link 32 is received in a slot 35 provided for it in the shaft 19 so that the lever 32 swings in a rigid unit with the shaft, the sleeve 28 being provided with an arcuate slot 36 to provide for the swinging movement of the link 32.

The operation of the invention will be apparent from Figs. 2 and 3. It will be understood that when the handle 21 is in its neutral position, the links 31 and 32 will be in alignment, as shown in full lines in Fig. 2, and that in this neutral condition the base 29 of the actuator 28 will rest squarely upon the bracket 24, and also that the pin 30 will rest in the lower end of the elongated slot 34. When the handle 21 is moved to an operating position, for example, in a counterclockwise direction to the operating position, as viewed in Fig. 2, the links 31 and 32 will be broken from their aligned position and will assume the dotted line position shown in Fig. 2 wherein they are angularly related to each other. In this position of the links, the pin 30 will be located in the upper end of the slot 34 but it will be spaced somewhat from the end, as shown in Fig. 2. An angular displacement of the lever 26 in response to a pulling or pushing of the frame 3 will rotate the release actuator upon the bracket 24, the direction of rotation depending upon the direction of rotation of the frame with respect to the head. Let it be assumed that the frame is rotated so as to move the lever 26 toward the right, as viewed in Fig. 3. When this happens, and when the actuator has been moved from its position of Fig. 2 to its full line position of Fig. 3, the pin 30 will have moved upwardly until it just engages the upper end of the slot 34, and in doing so will have moved the detent 23 upwardly sufficiently far to release the shaft 19, whereupon, upon further rocking movement of the release actuator to the dotted line position of Fig. 3, the pin will move the shaft 19 to its neutral position shown in Fig. 2 through the medium of the links 31 and 32.

In view of the foregoing, it will be seen that there is a direct mechanical connection between the release actuator and the detent 23 and the shaft 19. The mechanism obviates the necessity of using any spring means of returning the clutch mechanism to neutral as has been used heretofore in instinctive release mechanisms.

It should be borne in mind that emergency release devices of clothes wringers may never be operated, and yet they must always be in condition for operation. Many of the contemporary devices are subject to the criticism that notwithstanding their protection by exterior casings and the like usually applied to wringers for appearance purposes, operating parts may corrode so that their free movement is affected adversely with resultant sluggish operation or failure. My emergency device, because of its simplicity and its direct mechanical drive between the frame and the detent and the gear shift, has a high order of reliability.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. In a clothes wringer, the combination of a wringer head, frame means swingably carried thereon, wringer rolls journaled in said frame means, drive mechanism within said head and including gear shift mechanism for driving said rolls, means for operating said gear shift mechanism from neutral to a driving position, including a rotary shift actuator and handle means for effecting a rotation of said actuator, a detent carried by said wringer head for rectilinear movement therein, said detent engaging with said rotary actuator for releasably securing said gear shift mechanism in driving position, and means for withdrawing said detent for return of said actuator to neutral and for returning said actuator to neutral, comprising a member having a body portion extending in a plane parallel to the path of movement of said detent and a base portion carried by said wringer head to pivot in either direction thereon, pin means pivotally interconnecting said detent and said body portion, a lever extending from said frame means and engaging said body portion to enforce rotation of said detent withdrawing means upon swinging said frame means relative to said head thereby to withdraw said detent to release said actuator, and linkage mechanism mechanically interconnecting said pin means with said actuator to return said actuator to neutral after said pin means has withdrawn said detent.

2. In a clothes wringer, the combination of a wringer head, frame means swingably carried thereon, wringer rolls journaled in said frame means, drive mechanism within said head and including gear shift mechanism for driving said rolls, means for operating said gear shift mechanism from neutral to a driving position, including a rotary gear shift actuator, handle means for operating said actuator, a detent carried by said wringer head for rectilinear movement therein, said detent engaging with said actuator for releasably securing said gear shift mechanism in driving position, and means for withdrawing said detent and for returning said actuator to neutral, comprising a member having a body portion, a base portion extending angularly therefrom and carried by said wringer head, said base portion providing fulcrums at each side of said detent path, a pin pivotally interconnecting said detent and said body portion, means interconnecting said frame means and said body portion in spaced relationship with the base thereof to enforce rotation of said detent withdrawing member about a base fulcrum and consequent withdrawal of said detent to release said actuator upon rotation of said frame means relative to said head, and a pair of pivotally interconnected links, one link fixed to rotate with said actuator and the other link having an elongated slot therein receiving said pin whereby said other link is pivoted to said pin, said pin and slot permitting the withdrawal of said detent by said pin whereupon said pin engages said other link at the end of said slot to operate said links to return said actuator to neutral.

3. In a wringer, the combination of frame means and wringer rolls journaled for rotation therein, a wringer head, means for swingably mounting said frame means on said head, drive mechanism within said head for driving said rolls in one or another direction, said mechanism including a gear shift mechanism, a detent carried by said head for movement in a fixed path, means biasing said detent into engagement with said shift mechanism to secure the same in driving position, and means for disengaging said detent from said shift mechanism and moving said shift mechanism to neutral, comprising an angular member having an elongated base supported on said head to provide a pair of fulcrums at its ends for rotation of said angular member on said head in either of two directions, a pin pivotally securing said angular member to said detent above the base of said member, a lever fixed to said frame and engaging said angular member to rotate it in one or the other of said two directions depending upon the direction of movement of said lever by said frame, said pin precluding displacement of said angular member relative to said frame in the direction of movement of said lever in response to the swinging of said frame and thereby constraining said angular member to rock about one or the other of its fulcrums to enforce axial movement of said detent to release said shift mechanism, and linkage means mechanically interconnecting said pin and shift mechanism positively to move said shift mechanism to neutral in response to the movement of said pin by said angular member.

4. In a wringer having wringer rolls, a wringer frame supporting said rolls for rotation, a wringer head, drive mechanism therein including gear shift means for driving said rolls in one or another direction and means including a rotatable shaft to actuate said shift means, emergency release means for operating said shaft to restore said shift means to neutral from a driving position, comprising means for swingably mounting said frame on said head, a detent pin slidably carried on said head and biased for engagement with said shaft releasably to hold the same in driving position, a detent pin actuator pivotally associated with said pin and including a relatively wide base member supported on said wringer head, a lever extending from said wringer frame and engaging with said detent pin actuator above the base thereof, said pin constraining said actuator against bodily displacement in the direction of movement of said lever, whereby said lever movement will enforce a rotation of said actuator about an edge of its base as a fulcrum with resulting translation of the therewith pivotally associated detent pin relative to said shaft, a link fixed to said shaft, a second link pivoted at one end to said first link and having an elongated slot at its other end receiving said pin, said links being aligned in the neutral position of said shaft and angularly displaced with respect to each other in an operating position thereof and said slot providing for an initial free movement of said pin to withdraw said detent to release said shaft, and the pin thereupon engaging said link to move the two links into alignment and thereby said shaft to neutral.

SAMUEL I. GABRIELSON.

References Cited in the file of this patent

UNITED STATES PATENTS

| Number | Name | Date |
| --- | --- | --- |
| 2,561,195 | Gabrielson | July 17, 1951 |